United States Patent
Fukumoto et al.

(10) Patent No.: US 10,263,410 B2
(45) Date of Patent: Apr. 16, 2019

(54) HEAT-RECOVERABLE COMPONENT, ELECTRICAL WIRE BUNDLE, AND INSULATED ELECTRICAL WIRE-COVERING METHOD

(71) Applicants: SUMITOMO ELECTRIC INDUSTRIES, LTD., Osaka-shi, Osaka (JP); SUMITOMO ELECTRIC FINE POLYMER, INC., Sennan-gun, Osaka (JP)

(72) Inventors: Ryota Fukumoto, Osaka (JP); Satoshi Yamasaki, Osaka (JP); Shinya Nishikawa, Osaka (JP); Yuuki Yabe, Osaka (JP)

(73) Assignees: SUMITOMO ELECTRIC INDUSTRIES, LTD., Osaka-shi, Osaka (JP); SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 0 days.

(21) Appl. No.: 15/573,534

(22) PCT Filed: Jan. 10, 2017

(86) PCT No.: PCT/JP2017/000374
§ 371 (c)(1),
(2) Date: Nov. 13, 2017

(87) PCT Pub. No.: WO2017/122601
PCT Pub. Date: Jul. 20, 2017

(65) Prior Publication Data
US 2018/0109099 A1   Apr. 19, 2018

(30) Foreign Application Priority Data
Jan. 14, 2016 (JP) .................. 2016-005637

(51) Int. Cl.
*H01R 4/00* (2006.01)
*H02G 15/04* (2006.01)
(Continued)

(52) U.S. Cl.
CPC ............. *H02G 15/043* (2013.01); *B32B 1/08* (2013.01); *B32B 7/02* (2013.01); *H01B 7/282* (2013.01);
(Continued)

(58) Field of Classification Search
CPC ........ H02G 15/043; H01B 13/32; H01R 4/22; H01R 4/72
(Continued)

(56) References Cited

U.S. PATENT DOCUMENTS 4,832,248 A * 5/1989 Soni ................. H01R 4/723
174/84 R
4,940,179 A * 7/1990 Soni ................. B29C 61/0616
174/84 R
(Continued)

FOREIGN PATENT DOCUMENTS

CN   106457738 A   2/2017
JP   S63-146368   6/1988
(Continued)

*Primary Examiner* — William H Mayo, III
(74) *Attorney, Agent, or Firm* — Drinker Biddle & Reath LLP

(57) ABSTRACT

A heat-recoverable component includes a tube-shaped or cap-shaped base material layer having heat shrinkability, and an adhesive layer formed on an inner circumferential surface of the base material layer. The adhesive layer includes a low-viscosity adhesive portion and a high-viscosity adhesive portion disposed between the low-viscosity adhesive portion and an opening of the base material layer. The low-viscosity adhesive portion has a shear viscosity of 10 Pa·s or less at a shear rate of 1 s$^{-1}$ at a heat shrinkage (Continued)

temperature of the base material layer. The high-viscosity adhesive portion has a shear viscosity of 100 Pa·s or more at a shear rate of $1\ s^{-1}$ at the heat shrinkage temperature of the base material layer. At the heat shrinkage temperature, a ratio of the shear viscosity of the high-viscosity adhesive portion to the shear viscosity of the low-viscosity adhesive portion is 15,000 or less.

8 Claims, 3 Drawing Sheets

(51) Int. Cl.
  *B32B 7/02* (2019.01)
  *B32B 1/08* (2006.01)
  *H01B 7/282* (2006.01)
  *H01R 4/02* (2006.01)
  *H01R 4/72* (2006.01)
  *H01B 13/32* (2006.01)
  *H01R 4/22* (2006.01)
  *H02G 15/18* (2006.01)

(52) U.S. Cl.
  CPC .............. *H01B 13/32* (2013.01); *H01R 4/02* (2013.01); *H01R 4/22* (2013.01); *H01R 4/72* (2013.01); *H02G 15/1813* (2013.01); *H01R 2201/26* (2013.01); *Y02A 30/14* (2018.01)

(58) Field of Classification Search
  USPC ...... 174/74 R, 74 A, 76, 77 R, 79, 80, 84 R, 174/85, 88 R, 91, 94 R, 95
  See application file for complete search history.

(56) References Cited

U.S. PATENT DOCUMENTS

| | | | | |
|---|---|---|---|---|
| 5,015,512 A | * | 5/1991 | Matsumoto | H01R 4/723 174/84 R |
| 5,052,610 A | * | 10/1991 | Guerra | H01R 4/723 174/DIG. 8 |
| 5,086,967 A | * | 2/1992 | Delalle | B23K 3/06 228/246 |
| 5,143,761 A | * | 9/1992 | Chiotis | C09J 127/12 428/35.1 |
| 5,331,113 A | * | 7/1994 | Soni | H01R 4/22 174/84 R |
| 5,393,932 A | * | 2/1995 | Young | H01Q 1/244 174/84 R |
| 2017/0200536 A1 | | 7/2017 | Yabe et al. | |

FOREIGN PATENT DOCUMENTS

| | | |
|---|---|---|
| JP | H11-233175 A | 8/1999 |
| JP | 2009-099385 A | 5/2009 |

* cited by examiner

HEAT-RECOVERABLE COMPONENT, ELECTRICAL WIRE BUNDLE, AND INSULATED ELECTRICAL WIRE-COVERING METHOD

TECHNICAL FIELD

The present invention relates to a heat-recoverable component, an electrical wire bundle, and an insulated electrical wire-covering method. The present invention claims priority to Japanese Patent Application No. 2016-005637 filed Jan. 14, 2016, and the entire contents of the Japanese application are incorporated herein by reference.

BACKGROUND ART

As a wire harness for automobile and motorcycle use, an electrical wire bundle formed by binding together a plurality of insulated electrical wires with a cable tie, adhesive tape, or the like is used. Each of the insulated electrical wires is typically formed by covering, with an insulating material, a bundle of one or a plurality of strands made of a conductor such as a copper alloy. The strands are exposed at a connecting portion (joint) located at the end or middle of such an electrical wire bundle, and thus it is necessary to make such a portion waterproof. In order to achieve this waterproofing, a heat-recoverable component such as a heat-shrinkable tube or a heat-shrinkable cap is used. This heat-recoverable component includes, for example, a cylindrical base material layer and an adhesive portion disposed on the inner circumferential surface of the base material layer. When the connecting portion is covered with such a heat-recoverable component and heating is performed, the heat-recoverable component shrinks so as to conform to the shape of the connecting portion and comes into close contact with the connecting portion, thus achieving waterproofing of the connecting portion.

In waterproofing a wire harness, it is required to prevent entry of water from the outside into a connecting portion, and it is also required to block entry of water into gaps between strands disposed inside an insulated electrical wire. This water blocking between strands can prevent water from entering a connected device through insulated electrical wires disposed inside the device. However, since the adhesive used in the existing heat-recoverable component has a high viscosity, a process of simply thermally shrinking the heat-recoverable component does not cause the adhesive to sufficiently penetrate between strands, and it is not possible to sufficiently block entry of water into gaps between the strands.

In view of this, methods for blocking water between strands have been proposed in which an adhesive or a water-blocking agent having a low viscosity is injected from a connecting portion to block entry of water into gaps between strands, and a heat-recoverable component is then placed over the connecting portion and is thermally shrunk (refer to Japanese Unexamined Patent Application Publication Nos. 11-233175 and 2009-99385).

CITATION LIST

Patent Literature

PTL 1: Japanese Unexamined Patent Application Publication No. 11-233175
PTL 2: Japanese Unexamined Patent Application Publication No. 2009-99385

SUMMARY OF INVENTION

Solution to Problem

A heat-recoverable component according to an embodiment of the present invention is a heat-recoverable component including a tube-shaped or cap-shaped base material layer having heat shrinkability, and an adhesive layer formed on an inner circumferential surface of the base material layer. In the heat-recoverable component, the adhesive layer includes a low-viscosity adhesive portion and a high-viscosity adhesive portion disposed between the low-viscosity adhesive portion and an opening of the base material layer, the low-viscosity adhesive portion has a shear viscosity of 10 Pa·s or less at a shear rate of 1 $s^{-1}$ at a heat shrinkage temperature of the base material layer, the high-viscosity adhesive portion has a shear viscosity of 100 Pa·s or more at a shear rate of 1 $s^{-1}$ at the heat shrinkage temperature of the base material layer, and a ratio of the shear viscosity of the high-viscosity adhesive portion to the shear viscosity of the low-viscosity adhesive portion is 15,000 or less.

An electrical wire bundle according to another embodiment of the present invention is an electrical wire bundle including a plurality of insulated electrical wires bundled, and a tube-shaped or cap-shaped covering material that covers conductor-exposed portions in the plurality of insulated electrical wires, in which the heat-recoverable component is used as the covering material.

An insulated electrical wire-covering method according to still another embodiment of the present invention is an insulated electrical wire-covering method for covering conductor-exposed portions of a plurality of insulated electrical wires, the method including a step of placing the heat-recoverable component over the plurality of insulated electrical wires so as to cover the conductor-exposed portions, and a step of heating the heat-recoverable component.

DESCRIPTION OF EMBODIMENTS

[Technical Problem]

Figure 1:
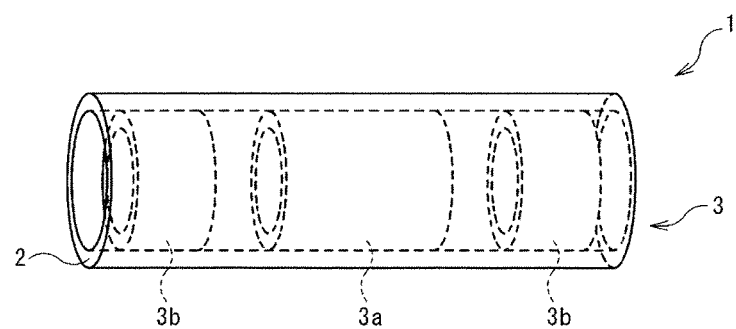
FIG. 1 is a perspective view of a heat-recoverable component according to an embodiment of the present invention.

In the existing methods described above, since water blocking between strands and covering of a connecting portion are performed in separate steps, there is a room for improvement in the productivity.

The present invention has been made in view of the circumstances described above. An object of the present invention is to provide a heat-recoverable component in which both waterproofing of conductor-exposed portions of insulated electrical wires and water blocking between strands can be achieved during heat shrinkage, an electrical wire bundle obtained by using the heat-recoverable component, and an insulated electrical wire-covering method using the heat-recoverable component.

[Advantageous Effects of the Present Disclosure]

In the heat-recoverable component according to the present invention, both waterproofing of conductor-exposed portions of insulated electrical wires and water blocking between strands can be achieved during heat shrinkage. Furthermore, since the electrical wire bundle and the insulated electrical wire-covering method according to the resent invention use the heat-recoverable component, a good productivity is achieved.

[Description of Embodiments of the Present Invention]

A heat-recoverable component according to an embodiment of the present invention is a heat-recoverable component including a tube-shaped or cap-shaped base material layer having heat shrinkability, and an adhesive layer formed on an inner circumferential surface of the base material layer. In the heat-recoverable component, the adhesive layer includes a low-viscosity adhesive portion and a high-viscosity adhesive portion disposed between the low-viscosity adhesive portion and an opening of the base material layer, the low-viscosity adhesive portion has a shear viscosity of 10 Pa·s or less at a shear rate of 1 s$^{-1}$ at a heat shrinkage temperature of the base material layer, the high-viscosity adhesive portion has a shear viscosity of 100 Pa·s or more at a shear rate of 1 s$^{-1}$ at the heat shrinkage temperature of the base material layer, and a ratio of the shear viscosity of the high-viscosity adhesive portion to the shear viscosity of the low-viscosity adhesive portion is 15,000 or less.

In order to achieve water blocking between strands of insulated electrical wires during heat shrinkage, it is conceivable to use an adhesive portion having a low viscosity such that the adhesive portion can penetrate between strands at the heat shrinkage temperature. However, when an adhesive portion having a low viscosity is used for a heat-recoverable component, the adhesive may flow out from an opening of a base material layer during heat shrinkage, and waterproofing may become insufficient. In view of this, as a result of extensive studies, the inventors of the present invention found that when an adhesive layer includes a low-viscosity adhesive portion and a high-viscosity adhesive portion, the high-viscosity adhesive portion is disposed between the low-viscosity adhesive portion and an opening of the base material layer, and viscosities of the adhesive portions and a viscosity ratio of the adhesive portions are appropriately controlled, during heat shrinkage, water blocking between strands can be achieved, and an outflow of an adhesive from an opening can be prevented. This finding led to the realization of the present invention. That is, the heat-recoverable component includes an adhesive layer including a low-viscosity adhesive portion and a high-viscosity adhesive portion disposed between the low-viscosity adhesive portion and an opening of the base material layer, in which the low-viscosity adhesive portion has a shear viscosity of the upper limit or less at a shear rate of 1 s$^{-1}$, the high-viscosity adhesive portion has a shear viscosity of the lower limit or more at a shear rate of 1 s$^{-1}$, and a ratio of the shear viscosity of the high-viscosity adhesive portion to the shear viscosity of the low-viscosity adhesive portion is the upper limit or less. Therefore, water blocking between the strands can be achieved during heat shrinkage. Specifically, in the heat-recoverable component, since the shear viscosity of the low-viscosity adhesive portion is the upper limit or less, a low-viscosity adhesive can penetrate between the strands at the heat shrinkage temperature, and water blocking between the strands can be achieved during heat shrinkage. In the heat-recoverable component, since the high-viscosity adhesive portion is disposed between the low-viscosity adhesive portion and an opening of the base material layer and the shear viscosity of the high-viscosity adhesive portion is the lower limit or more, the opening of the base material layer is clogged with the high-viscosity adhesive portion, and an outflow of the low-viscosity adhesive from the opening of the base material layer can be prevented. Furthermore, in the heat-recoverable component, since the ratio of the shear viscosities is the upper limit or less, it is possible to prevent the low-viscosity adhesive from flowing out from the opening of the base material layer before the opening of the base material layer is clogged with the high-viscosity adhesive portion during heat shrinkage.

The low-viscosity adhesive portion preferably contains a polyamide as a main component. Viscosities of polyamides significantly change in a relatively narrow temperature range. Accordingly, when the low-viscosity adhesive portion contains a polyamide as a main component, during heat shrinkage of the heat-recoverable component, the low-viscosity adhesive has a low viscosity and can easily penetrate between the strands, and thus the effect of blocking entry of water between strands can be enhanced. In contrast, during use of the heat-recoverable component, since the low-viscosity adhesive portion is unlikely to be softened, the effect of blocking entry of water between strands can be maintained. Furthermore, since polyamides are easily adjusted to have desired viscosities, manufacturability of the heat-recoverable component increases.

The high-viscosity adhesive portion preferably contains, as a main component, a polyethylene, an ethylene-vinyl acetate copolymer, an ethylene-ethyl acrylate copolymer, or a polyamide. Polyethylenes, ethylene-vinyl acetate copolymers, ethylene-ethyl acrylate copolymers, and polyamides have good adhesiveness between the base material layer and an insulating coating of an insulated electrical wire. Therefore, when the high-viscosity adhesive portion contains, as a main component, a polyethylene, an ethylene-vinyl acetate copolymer, an ethylene-ethyl acrylate copolymer, or a polyamide, it is possible to reliably prevent the adhesive layer from being separated from the base material layer or the insulating coating during use.

An electrical wire bundle according to another embodiment of the present invention is an electrical wire bundle including a plurality of insulated electrical wires bundled, and a tube-shaped or cap-shaped covering material that covers conductor-exposed portions in the plurality of insulated electrical wires, in which the heat-recoverable component is used as the covering material.

Since the electrical wire bundle is obtained by using the heat-recoverable component, during heat shrinkage, the conductor-exposed portions can be made waterproof, and water blocking between strands of the insulated electrical wires can be achieved. Therefore, the electrical wire bundle has good productivity.

An insulated electrical wire-covering method according to still another embodiment of the present invention is an insulated electrical wire-covering method for covering conductor-exposed portions of a plurality of insulated electrical wires, the method including a step of placing the heat-recoverable component over the plurality of insulated electrical wires so as to cover the conductor-exposed portions, and a step of heating the heat-recoverable component.

Since the insulated electrical wire-covering method uses the heat-recoverable component, when the heat-recoverable component is thermally shrunk in the step of heating the heat-recoverable component, the conductor-exposed portions can be covered with an insulating coating and made waterproof, and water blocking in the gaps between the strands of the insulated electrical wires can be achieved. Therefore, the insulated electrical wire-covering method has good productivity.

Herein, the term "shear viscosity" refers to a value measured with a rotary rheometer. The term "main component" refers to a component that has the highest content and, for example, a component having a content of 50% by mass or more.

[Details of Embodiments of the Present Invention]

A heat-recoverable component, an electrical wire bundle, and an insulated electrical wire-covering method according to embodiments of the present invention will now be described in detail with reference to the drawings.

[Heat-Recoverable Component]

A heat-recoverable component 1 illustrated in FIG. 1 is a heat-recoverable component including a tube-shaped base material layer 2 having heat shrinkability and an adhesive layer 3 formed on the inner circumferential surface of the base material layer 2.

<Base Material Layer>

The average inner diameter and the average thickness of the base material layer 2 are appropriately selected according to intended use or the like. The average inner diameter of the base material layer 2 before heat shrinkage may be, for example, 1 mm or more and 60 mm or less. The inner diameter of the base material layer 2 after heat shrinkage may be, for example, 30% or more and 50% or less of the average inner diameter before heat shrinkage. The average thickness of the base material layer 2 may be, for example, 0.1 mm or more and 5 mm or less.

The base material layer 2 preferably contains, as a main component, a polyethylene, polyester, polyamide, polyvinyl chloride, or fluororesin. These resins may be used alone or in combination of a plurality of resins. When the base material layer 2 contains any of the above resins cited as examples, the base material layer 2 can have appropriate heat shrinkability. In addition, since the above resins cited as examples are available at a relatively low cost, the production cost can be reduced.

Herein, the term "fluororesin" refers to a resin in which at least one hydrogen atom bonded to a carbon atom that fours a repeating unit of a polymer chain is substituted with a fluorine atom or an organic group having a fluorine atom (hereinafter, may be referred to as "fluorine atom-containing group"). The fluorine atom-containing group is a group in which at least one hydrogen atom in a linear or branched organic group is substituted with a fluorine atom. Examples of the fluorine atom-containing group include fluoroalkyl groups, fluoroalkoxy groups, and fluoropolyether groups.

The term "fluoroalkyl group" refers to an alkyl group in which at least one hydrogen atom is substituted with a fluorine atom and covers a "perfluoroalkyl group". Specifically, the term "fluoroalkyl group" covers, for example, a group in which all hydrogen atoms of an alkyl group are each substituted with a fluorine atom, and a group in which all hydrogen atoms other than a single hydrogen atom at the end of an alkyl group are each substituted with a fluorine atom.

The term "fluoroalkoxy group" refers to an alkoxy group in which at least one hydrogen atom is substituted with a fluorine atom and covers a "perfluoroalkoxy group". Specifically, the term "fluoroalkoxy group" covers, for example, a group in which all hydrogen atoms of an alkoxy group are each substituted with a fluorine atom, and a group in which all hydrogen atoms other than a single hydrogen atom at the end of an alkoxy group are each substituted with a fluorine atom.

The term "fluoropolyether group" refers to a monovalent group that has a plurality of alkylene oxide chains as a repeating unit and has an alkyl group or a hydrogen atom at an end thereof, in which at least one hydrogen atom of the alkylene oxide chains and/or the alkyl group or the hydrogen atom at the end is substituted with a fluorine atom. The term "fluoropolyether group" covers a "perfluoropolyether group" that has a plurality of perfluoroalkylene oxide chains as a repeating unit.

The lower limit of the heat shrinkage temperature of the base material layer 2 is preferably 100° C. and more preferably 120° C. The upper limit of the heat shrinkage temperature of the base material layer 2 is preferably 200° C. and more preferably 180° C. When the heat shrinkage temperature of the base material layer 2 is lower than the lower limit and an electrical wire bundle covered with the heat-recoverable component 1 is used in a high-temperature environment, an adhesive may become softened and the waterproof effect of the heat-recoverable component 1 may decrease. In contrast, when the heat shrinkage temperature of the base material layer 2 exceeds the upper limit temperature and the heat-recoverable component 1 is thermally shrunk, insulated electrical wires to be covered may be damaged by a high temperature, and thermal energy for heating is unnecessarily increased, which may result in an increase in the cost of covering insulated electrical wires.

Preferably, a flame retardant is added to the base material layer 2 for the purpose of improving flame retardancy. Furthermore, other additives may be optionally added to the base material layer 2. Examples of the additives include an oxidation inhibitor, a copper inhibitor, a lubricant, a coloring agent, a heat stabilizer, and an ultraviolet absorber.

(Flame Retardant)

Examples of the flame retardant include chlorine-based flame retardants such as chlorinated paraffin, chlorinated polyethylene, chlorinated polyphenyl, and perchloropentacyclodecane; bromine-based flame retardants such as 1,2-bis(2,3,4,5,6-pentabromophenyl)ethane, ethylenebispentabromobenzene, ethylenebispentabromodiphenyl, tetrabromoethane, tetrabromobisphenol A, hexabromobenzene, decabromobiphenyl ether, tetrabromophthalic anhydride, polydibromophenylene oxide, hexabromocyclodecane, and ammonium bromide; phosphate esters or phosphorus compounds such as triallyl phosphate, alkyl aryl phosphates, alkyl phosphates, dimethyl phosphonate, phosphorinate, halogenated phosphorinate esters, trimethyl phosphate, tributyl phosphate, trioctyl phosphate, tributoxyethyl phosphate, octyldiphenyl phosphate, tricresyl phosphate, cresylphenyl phosphate, triphenyl phosphate, tris(chloroethyl) phosphate, tris(2-chloropropyl) phosphate, tris(2,3-dichloropropyl) phosphate, tris(2,3-dibromopropyl) phosphate, tris(bromochloropropyl) phosphate, bis(2,3-dibromopropyl)2,3-dichloropropyl phosphate, bis (chloropropyl)monooctyl phosphate, polyphosphonate, polyphosphate, aromatic polyphosphates, dibromoneopentyl glycol, and aluminum tris(diethylphosphinate); polyols such as phosphonate-type polyols, phosphate-type polyols, and halogen element-containing polyols; nitrogen compounds such as melamine cyanurate, triazine, isocyanurates, urea, and guanidine; and other compounds such as silicone polymers, ferrocene, fumaric acid, and maleic acid. Of these, halogen-based flame retardants such as bromine-based flame retardants and chlorine-based flame retardants are preferable. Bromine-based flame retardants and chlorine-based flame retardants may be used alone or in combination of two or more thereof.

The lower limit of the content of the flame retardant in the base material layer 2 is preferably 1 part by mass and more preferably 5 parts by mass relative to 100 parts by mass of the resin component. The upper limit of the content of the flame retardant is preferably 100 parts by mass and more preferably 80 parts by mass relative to 100 parts by mass of the resin component. When the content of the flame retardant is less than the lower limit, the effect of imparting flame retardancy may not be obtained. When the content of the flame retardant exceeds the upper limit, the toughness and elongation of the heat-recoverable component 1 may be degraded.

(Oxidation Inhibitor)

Examples of the oxidation inhibitor include phenol-based compounds, amine-based compounds, hindered amine-based compounds, hindered phenol-based compounds, salicylic acid derivatives, benzophenone-based compounds, and benzotriazole-based compounds. In particular, hindered amine-based compounds, which have a good effect of suppressing crosslinking are suitably used. As the oxidation inhibitor, besides the above oxidation inhibitors, sulfur-based compounds, phosphite ester-based compounds, and the like may be used alone or in combination.

The lower limit of the content of the oxidation inhibitor in the base material layer 2 is preferably 1 part by mass and more preferably 1.5 parts by mass relative to 100 parts by mass of the resin component. The upper limit of the content of the oxidation inhibitor is preferably 30 parts by mass and more preferably 20 parts by mass relative to 100 parts by mass of the resin component. When the content of the oxidation inhibitor is less than the lower limit, the base material layer 2 becomes easily oxidized, and the heat-recoverable component 1 may be degraded. When the content of the oxidation inhibitor exceeds the upper limit, blooming and bleeding may occur.

Examples of the phenol-based compound used as the oxidation inhibitor include pentaerythritol tetrakis 3-(3,5-di-tert-butyl-4-hydroxyphenyl)propionate, tetrakis-[methylene-3-(3'5'-di-tert-butyl-4'-hydroxypheny)ppropionate] methane, triethylene glycol-bis[3-(3-tert-butyl-5-methyl-4-hydroxyphenyl)propionate], and 6-(4-hydroxy-3,5-di-tert-butyl anilino)-2,4-bis octyl-thio-1,3,5-triazine.

Examples of the amine-based compound used as the oxidation inhibitor include 4,4'($\alpha,\alpha$-dimethylbenzyl)diphenylamine, polymerized products of 2,2,4-trimethyl-1,2-dihydroquinoline, 6-ethoxy-2,2,4-trimethyl-1,2-dihydroquinoline, N-(1,3-dimethylbutyl)-N'-phenyl-1,4-phenylenediamine, and N-isopropyl-N'-phenyl-1,4-phenylenediamine.

<Adhesive Layer>

The adhesive layer 3 is formed on the inner circumferential surface of the base material layer 2. The adhesive layer 3 includes a low-viscosity adhesive portion 3a and a pair of high-viscosity adhesive portions 3b which are disposed between the low-viscosity adhesive portion 3a and one opening of the base material layer 2 and between the low-viscosity adhesive portion 3a and the other opening of the base material layer 2. The low-viscosity adhesive portion 3a and the high-viscosity adhesive portions 3b each have a ring shape. The low-viscosity adhesive portion 3a is disposed between the pair of high-viscosity adhesive portions 3b.

(Low-Viscosity Adhesive Portion)

The average thickness and the average length of the low-viscosity adhesive portion 3a are determined so as to ensure an amount of adhesive such that waterproofness and a property of blocking entry of water between strands can be ensured by filling the inside of the base material layer 2 after shrinkage and to ensure an inner diameter such that insulated electrical wires can pass through the inside of the heat-recoverable component 1. Furthermore, the average length of the low-viscosity adhesive portion 3a is determined in consideration that the high-viscosity adhesive portions 3b can be disposed between the low-viscosity adhesive portion 3a and one opening of the base material layer 2 and between the low-viscosity adhesive portion 3a and the other opening of the base material layer 2. The average thickness of the low-viscosity adhesive portion 3a may be, for example, 2% or more and 8% or less of the average inner diameter of the base material layer 2. The average length of the low-viscosity adhesive portion 3a is shorter than the average length of the base material layer 2, and the difference between the average length of the low-viscosity adhesive portion 3a and the average length of the base material layer 2 may be 30 mm or more and 60 mm or less.

Preferably, the midpoint of the low-viscosity adhesive portion 3a in the length direction substantially coincides with the midpoint of the base material layer 2 in the length direction. When the two midpoints are substantially caused to coincide in this manner, the distance between each end of the low-viscosity adhesive portion 3a and an opening of the base material layer 2 closer to the end can be ensured, thus improving an effect of preventing the adhesive from flowing out from the opening of the base material layer 2. Note that the expression "the midpoint of the low-viscosity adhesive portion in the length direction substantially coincides with the midpoint of the base material layer in the length direction" means that the difference between the two midpoints is 5% or less of the average length of the low-viscosity adhesive portion.

The adhesive constituting the low-viscosity adhesive portion 3a needs to have a low viscosity to the extent that the adhesive can penetrate in the gaps between strands at a heat shrinkage temperature of the base material layer 2. Examples of the main component of such an adhesive include polyamides, ethylene-vinyl acetate copolymers (EVA), and ethylene-ethyl acrylate copolymers (EEA). In addition, the low-viscosity adhesive portion 3a preferably has a high viscosity to the extent that a sufficient effect of blocking entry of water between strands is maintained at a temperature which is lower than the heat shrinkage temperature, for example, a maximum temperature at which an electrical wire bundle covered with the heat-recoverable component 1 is used. Therefore, preferably, the viscosity of the low-viscosity adhesive portion 3a significantly changes in a relatively narrow temperature range. From the viewpoint of this viscosity change and the viewpoint of manufacturability that the viscosity is easily adjusted to a desired value, the main component of the adhesive constituting the low-viscosity adhesive portion 3a is preferably a polyamide.

The lower limit of a softening point (or a melting point) of the low-viscosity adhesive portion 3a is preferably 80° C. and more preferably 90° C. The upper limit of the softening point of the low-viscosity adhesive portion 3a is preferably 130° C. and more preferably 110° C. When the softening point of the low-viscosity adhesive portion 3a is lower than the lower limit, a low-viscosity adhesive may soften during use of the heat-recoverable component 1, and the effect of blocking entry of water between strands may not be maintained. In contrast, when the softening point of the low-viscosity adhesive portion 3a exceeds the upper limit, the viscosity of the low-viscosity adhesive portion 3a does not sufficiently decrease during thermal compression, and a sufficient effect of blocking entry of water between strands may not be achieved. Herein, the term "softening point" refers to a value measured by thermomechanical analysis (TMA). Specifically, the softening point is a measured value determined by an indentation measurement at a load of 0.3 g with a jig having a diameter ϕ of 3 mm using a TMA analyzer while the temperature is increased from 25° C. to 150° C. at 10° C./min in a nitrogen atmosphere.

The upper limit of the shear viscosity at a shear rate of 1 $s^{-1}$ in the low-viscosity adhesive portion 3a at the heat shrinkage temperature of the base material layer 2 is 10 Pa·s, more preferably 2 Pa·s, and still more preferably 1 Pa·s. When the shear viscosity exceeds the upper limit, the low-viscosity adhesive cannot sufficiently penetrate in the gaps between strands at the heat shrinkage temperature of the base material layer 2, and the effect of blocking entry of water between the strands may decrease. The lower limit of the shear viscosity is not particularly limited. However, it is necessary that the ratio of the shear viscosity of the high-viscosity adhesive portions 3b to the shear viscosity of the low-viscosity adhesive portion 3a be 15,000 or less.

The lower limit of the shear viscosity at a shear rate of 1 $s^{-1}$ in the low-viscosity adhesive portion 3a at 125° C. is preferably 100 Pa·s and more preferably 200 Pa·s. When the shear viscosity at 125° C. is less than the lower limit, the effect of blocking entry of water between strands may become insufficient at a maximum temperature at which an electrical wire bundle covered with the heat-recoverable component 1 is used. The upper limit of the shear viscosity at 125° C. is not particularly limited. The higher the shear viscosity at 125° C., the better.

(High-Viscosity Adhesive Portion)

The average thickness and the average length of the high-viscosity adhesive portions 3b are determined so as to clog openings of the base material layer 2 to be capable of preventing the low-viscosity adhesive portion 3a from flowing out when the heat-recoverable component 1 is thermally shrunk and so as to ensure an inner diameter such that insulated electrical wires can pass through the inside of the heat-recoverable component 1. Furthermore, the average length of each of the high-viscosity adhesive portions 3b is determined in consideration that the high-viscosity adhesive portion 3b can be disposed between the low-viscosity adhesive portion 3a and an opening of the base material layer 2. The average thickness of each of the high-viscosity adhesive portions 3b may be, for example, 2% or more and 8% or less of the average inner diameter of the base material layer 2. The average length of each of the high-viscosity adhesive portions 3b may be 5 mm or more and 30 mm or less.

The high-viscosity adhesive portions 3b may be disposed so as to be continuous with the ends of the low-viscosity adhesive portion 3a. Alternatively, as illustrated in FIG. 1, a gap may be formed between the low-viscosity adhesive portion 3a and each of the high-viscosity adhesive portions 3b. The formation of this gap can enhance the effect of preventing a low-viscosity adhesive from flowing out. The lower limit of the gap is preferably 2 mm and more preferably 5 mm. The upper limit of the gap is preferably 15 mm and more preferably 12 mm. When the gap is less than the lower limit, a sufficient effect of preventing a low-viscosity adhesive from flowing out may not be achieved. In contrast, when the gap exceeds the upper limit, it is necessary to increase the average thickness of the adhesive layer 3 for the purpose of ensuring the amount of adhesive that fills the inside of the base material layer 2 after shrinkage. As a result, it may become difficult for insulated electrical wires to be allowed to pass inside the heat-recoverable component 1.

An end face of each of the high-viscosity adhesive portions 3b on the opening side of the base material layer 2 may be flush with an opening surface of the base material layer 2. Alternatively, as illustrated in FIG. 1, the end face of the high-viscosity adhesive portion 3b on the opening side of the base material layer 2 may be located inside the base material layer 2 with respect to the opening surface of the base material layer 2. When the end face of the high-viscosity adhesive portion 3b on the opening side of the base material layer 2 is located inside the base material layer 2 with respect to the opening surface of the base material layer 2, the distance between the end face of the high-viscosity adhesive portion 3b and the opening surface of the base material layer 2 is not particularly limited but may be, for example, 1 mm or more and 5 mm or less. When the distance is less than the lower limit, a high-viscosity adhesive may flow out from the opening of the base material layer 2. In contrast, when the distance exceeds the upper limit, it is necessary to increase the average thickness of the adhesive layer 3 for the purpose of ensuring the amount of adhesive that fills the inside of the base material layer 2 after shrinkage. As a result, it may become difficult for insulated electrical wires to be allowed to pass inside the heat-recoverable component 1.

The adhesive constituting the high-viscosity adhesive portions 3b needs to have a high viscosity to the extent that, at the heat shrinkage temperature of the base material layer 2, the adhesive constituting the high-viscosity adhesive portions 3b rapidly clogs the openings of the base material layer 2 so as to prevent an adhesive constituting the low-viscosity adhesive portion 3a from flowing out from the openings of the base material layer 2 and does not flow out from the openings of the base material layer 2. Examples of the main component of such an adhesive include polyolefins such as polyethylenes, thermoplastic polyesters, EVA, EEA, and polyamides. Of these, a polyethylene, EVA, EEA, or polyamide is preferable.

Polyethylenes, EVA, EEA, and polyamides have good adhesiveness to the base material layer 2 and insulating coatings of insulated electrical wires. Thus, the adhesive layer 3 is unlikely to be separated from the base material layer 2 or the insulating coatings during use.

The lower limit of the shear viscosity at a shear rate of 1 $s^{-1}$ in the high-viscosity adhesive portions 3b at the heat shrinkage temperature of the base material layer 2 is 100 Pa·s, more preferably 200 Pa·s, still more preferably 400 Pa·s, and particularly preferably 3,000 Pa·s. When the shear viscosity is less than the above value, a sufficient effect of preventing the low-viscosity adhesive from flowing out from the openings of the base material layer 2 may not be obtained.

The upper limit of the shear viscosity is not particularly limited. However, it is necessary that the ratio of the shear viscosity of the high-viscosity adhesive portions 3b to the shear viscosity of the low-viscosity adhesive portion 3a be 15,000 or less.

The lower limit of the shear viscosity at a shear rate of 1 $s^{-1}$ in the high-viscosity adhesive portions 3b at 125° C. is preferably 400 Pa·s, more preferably 1,000 Pa·s, and still more preferably 5,000 Pa·s. When the shear viscosity at 125° C. is less than the lower limit, the waterproof effect may become insufficient at a maximum temperature at which an electrical wire bundle covered with the heat-recoverable component 1 is used. The upper limit of the shear viscosity at 125° C. is not particularly limited. The higher the shear viscosity at 125° C., the better.

The upper limit of the ratio of the shear viscosity of the high-viscosity adhesive portions 3b to the shear viscosity of the low-viscosity adhesive portion 3a is 15,000, preferably 8,000, and more preferably 900. When the ratio of the shear viscosities exceeds the upper limit, the low-viscosity adhesive may flow out from the openings of the base material layer 2 before the high-viscosity adhesive clogs the openings of the base material layer 2 due to the difference in viscosity. The lower limit of the ratio of the shear viscosities is not particularly limited. However, the ratio is 10 or more because the shear viscosity of the low-viscosity adhesive portion 3a is 10 Pa·s or less, and the shear viscosity of the high-viscosity adhesive portions 3b is 100 Pa·s or more.

The adhesive layer 3 may contain additives such as an oxidation inhibitor, a viscosity improver, a deterioration inhibitor, a flame retardant, a lubricant, a coloring agent, a heat stabilizer, an ultraviolet absorber, and a gluing agent.

<Method for Producing Heat-Recoverable Component>

The heat-recoverable component 1 can be obtained by a production method including a base material layer preparation step and an adhesive layer formation step.

(Base Material Layer Preparation Step)

The base material layer preparation step is a step of preparing a base material layer 2 and includes, for example, a step of extrusion molding, a step of expanding the diameter, and a step of fixation.

The step of extrusion molding is performed by extruding a resin composition for forming a base material layer 2 using a known melt extruder. Specifically, extrusion molding is performed by using an extruding die having a cylindrical space through which a layer corresponding to the base material layer 2 is extruded. As a result, an extruded article is obtained. In this extruded article, the material constituting the base material layer resin composition may be crosslinked to improve heat resistance. Examples of the crosslinking method include crosslinking by irradiation with ionizing radiation, chemical crosslinking, and thermal crosslinking.

The dimensions of the extruded article can be designed according to intended use or the like. The average inner diameter of the extruded article is, for example, 0.4 mm or more and 30 mm or less, and the maximum wall thickness of the extruded article is 0.4 mm or more and 10 mm or less.

Next, in the step of expanding the diameter, the diameter of the extruded article is expanded. The expansion of the diameter of the extruded article is performed by heating the extruded article to a temperature equal to or higher than the melting point, in that state, inflating the extruded article so as to have a predetermined inner diameter by a method of introducing compressed air thereinto, a method of inserting a metal rod thereinto, or the like, and subsequently conducting cooling to fix the shape. Such an expansion of the diameter of the extruded article is performed such that, for example, the inner diameter of the extruded article is increased by two times or more and four times or less.

Next, in the step of fixation, the shape of the extruded article whose diameter has been expanded is fixed. An example of this fixing method is a method of conducting cooling to a temperature equal to or lower than the melting point of a resin component of the base material layer 2 or the like. As a result, the base material layer 2 is obtained.

(Adhesive Layer Formation Step)

The adhesive layer formation step is a step of forming an adhesive layer 3 on the inner circumferential surface of the base material layer 2 and includes, for example, a step of forming a low-viscosity adhesive portion and a step of forming high-viscosity adhesive portions.

In the step of forming a low-viscosity adhesive portion, a low-viscosity adhesive tube is fixed to the inside of the base material layer 2 to form a low-viscosity adhesive portion 3a. Specifically, first, a low-viscosity adhesive tube having a smaller inner diameter than the base material layer 2 is prepared. The low-viscosity adhesive tube can be formed by, for example, extrusion molding as in the base material layer 2. Next, the low-viscosity adhesive tube is inserted into a central portion of the base material layer 2. Subsequently, a portion of the base material layer 2, the portion corresponding to the position of the low-viscosity adhesive tube, is thermally shrunk from the outer surface of the base material layer 2, to thereby bring the inner surface of the base material layer 2 into contact with the outer surface of the low-viscosity adhesive tube and to fix the low-viscosity adhesive tube. As a result, a low-viscosity adhesive portion 3a is formed.

In the step of forming high-viscosity adhesive portions, high-viscosity adhesive tubes are fixed to the inside of the base material layer 2 to form high-viscosity adhesive portions 3b. As in the step of forming a low-viscosity adhesive portion, high-viscosity adhesive tubes are prepared, and the high-viscosity adhesive tubes are fixed between the low-viscosity adhesive portion 3a and one opening of the base material layer 2 and between the low-viscosity adhesive portion 3a and the other opening of the base material layer 2. As a result, the high-viscosity adhesive portions 3b are formed. Note that the fixation of the high-viscosity adhesive portions 3b and the fixation of the low-viscosity adhesive portion 3a may be performed simultaneously or separately.

[Insulated Electrical Wire-Covering Method Using the Heat-Recoverable Component]

Figure 2:
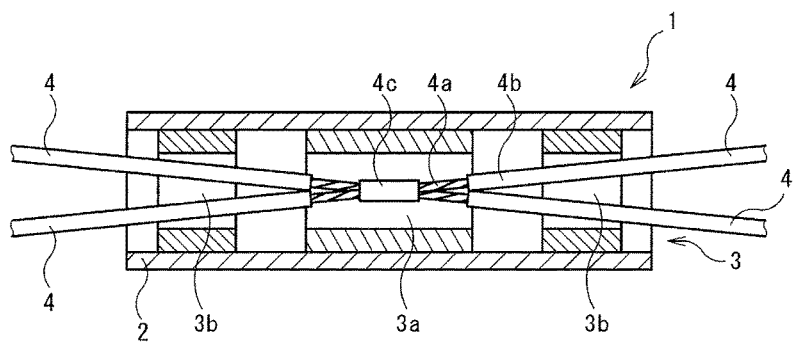
FIG. 2 is a schematic longitudinal sectional view illustrating a state in which the heat-recoverable component in FIG. 1 is placed over insulated electrical wires.
Figure 3:
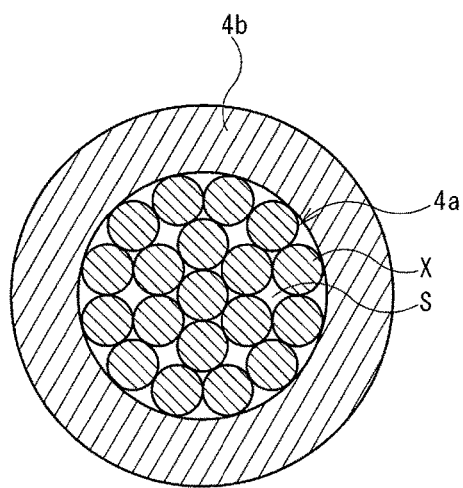
FIG. 3 is a schematic cross-sectional view illustrating one of the insulated electrical wires in FIG. 2.

The insulated electrical wire-covering method is an insulated electrical wire-covering method for covering conductor-exposed portions of a plurality of insulated electrical wires and includes a conductor-exposed portion-covering step, a heat-recoverable component-heating step, and a cooling step. Hereinafter, a description will be given of a case where two insulated electrical wires 4 are connected to each other, as illustrated in FIG. 2. However, the number and the configuration of the insulated electrical wires 4 are not limited to those in FIG. 2. At an end of each of the insulated electrical wires 4, a conductor 4a is exposed. Regarding the exposed portions of the conductors 4a of the insulated electrical wires 4, respective two are bundled. Furthermore, two bundled insulated electrical wires 4 are joined together with a joint 4c. As illustrated in FIG. 3, each of the insulated electrical wires 4 is obtained by covering, with an insulating coating 4b, a conductor 4a constituted by one or a plurality of strands X. FIG. 3 illustrates a case where the conductor 4a is constituted by a plurality of strands X. There are gaps (gaps S between strands) between the plurality of strands X and between the insulating coating 4b and the strands X. There is a concern that if water enters the insulated electrical wire 4, the water may enter inside a connected device through the gaps S between the strands. Therefore, water blocking between the strands is necessary.

<Conductor-Exposed Portion-Covering Step>

In the conductor-exposed portion-covering step, as illustrated in FIG. 2, the heat-recoverable component 1 is placed over a plurality of insulated electrical wires 4 so as to cover exposed portions of conductors 4a of the plurality of insulated electrical wires 4. Specifically, a plurality of insulated electrical wires 4 are allowed to pass inside the heat-recoverable component 1, and the heat-recoverable component 1 is moved to a position at which exposed portions of conductors 4a are covered.

The heat-recoverable component 1 is preferably placed such that the boundary between the exposed portion of the conductor 4a and the insulating coating 4b of each of the insulated electrical wires 4 is covered with the low-viscosity adhesive portion 3a. With this covering, when the heat-recoverable component 1 is heated, a low-viscosity adhesive easily penetrates into the inside of the insulating coating 4b of each of the insulated electrical wires 4 from the boundary. Thus, the effect of blocking entry of water between strands can be enhanced.

<Heat-Recoverable Component-Heating Step>

In the heat-recoverable component-heating step, the heat-recoverable component 1 is heated to be thermally shrunk.

An example of the heating method is a method of heating the heat-recoverable component 1 with a heat gun or the like. The heating temperature is determined according to the heat shrinkage temperature of the heat-recoverable component 1 and is, for example, 100° C. or higher and 200° C. or lower. The heating time is not limited as long as the heat-recoverable component 1 is sufficiently shrunk and may be, for example, 3 minutes or more and 15 minutes or less.

When the heat-recoverable component 1 is heated, an adhesive of the low-viscosity adhesive portion 3a flows and spreads. In contrast, since an adhesive of the high-viscosity adhesive portions 3b has a high viscosity, the adhesive of the high-viscosity adhesive portions 3b does not spread compared with the low-viscosity adhesive portion 3a and clogs openings of the base material layer 2. This configuration prevents the adhesive of the low-viscosity adhesive portion 3a from flowing out from the openings of the base material layer 2. In addition, the adhesive of the low-viscosity adhesive portion 3a covers the exposed portions of the conductors 4a of the insulated electrical wires 4 and penetrates into the inside of each of the insulating coatings 4b from the boundary between the insulating coating 4b and the corresponding exposed portion of the conductor 4a of the insulated electrical wire 4.

<Cooling Step>

In the cooling step, the heat-recoverable component 1 after heat shrinkage is cooled. The cooling method is not particularly limited. For example, natural cooling or forced cooling with cold air or the like may be employed. The low-viscosity adhesive and the high-viscosity adhesive are solidified by this cooling to achieve waterproofing of the exposed portions of the conductors 4a of the insulated electrical wires 4 and water blocking in the gaps S between the strands of the insulated electrical wires 4.

[Electrical Wire Bundle]

Figure 4:
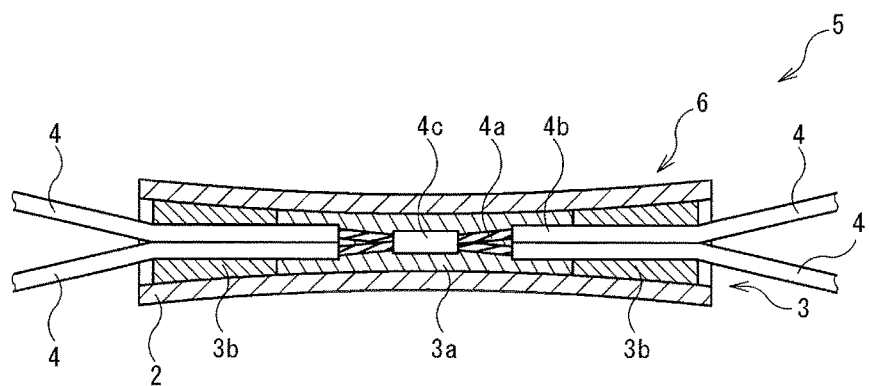
FIG. 4 is a schematic longitudinal sectional view illustrating an electrical wire bundle after the heat-recoverable component in FIG. 2 is thermally shrunk.

An electrical wire bundle 5 illustrated in FIG. 4 is an electrical wire bundle including a plurality of insulated electrical wires 4 bundled and a tube-shaped covering material 6 that covers exposed portions of conductors 4a of the plurality of insulated electrical wires 4. The heat-recoverable component 1 is used as the covering material 6.

In the electrical wire bundle 5, when the heat-recoverable component 1 is thermally shrunk, high-viscosity adhesive portions 3b clog openings of a base material layer 2, thus preventing an adhesive of a low-viscosity adhesive portion 3a from flowing out from the opening of the base material layer 2. In addition, the adhesive of the low-viscosity adhesive portion 3a covers the exposed portions of the conductors 4a of the insulated electrical wires 4 and penetrates into the inside of insulating coatings 4b from the boundary between each of the insulating coatings 4b and the corresponding exposed portion of the conductor 4a of the insulated electrical wire 4. As a result, when the heat-recoverable component 1 is thermally shrunk, waterproofing of the exposed portions of the conductors 4a and the insulated electrical wires 4 and water blocking in the gaps S between strands can be achieved in the electrical wire bundle 5. Accordingly, the electrical wire bundle 5 has good productivity.

[Advantages]

In the heat-recoverable component 1, the high-viscosity adhesive portions 3b are disposed between the low-viscosity adhesive portion 3a and one opening of the base material layer 2 and between the low-viscosity adhesive portion 3a and the other opening of the base material layer 2, and the shear viscosity of the high-viscosity adhesive portions 3b is the lower limit or more. Therefore, the openings of the base material layer 2 are clogged with the high-viscosity adhesive portions 3b, thus preventing the low-viscosity adhesive from flowing out from the openings of the base material layer 2. Furthermore, in the heat-recoverable component 1, since the shear viscosity of the low-viscosity adhesive portion 3a is the upper limit or less, the low-viscosity adhesive penetrates between the strands and fills the gaps S between the strands at the heat shrinkage temperature, to thereby achieve water blocking of the gaps S between the strands of the insulated electrical wires 4 during heat shrinkage. Furthermore, in the heat-recoverable component 1, since the above ratio of the shear viscosities is the upper limit or less, it is possible to prevent the low-viscosity adhesive from flowing out from the openings of the base material layer 2 before the openings of the base material layer 2 are clogged with the high-viscosity adhesive portions 3b during heat shrinkage.

In the insulated electrical wire-covering method, the heat-recoverable component 1 is used. Accordingly, when the heat-recoverable component 1 is thermally shrunk in the step of heating the heat-recoverable component 1, the conductor-exposed portions can be covered with an insulating coating and made waterproof, and water blocking in the gaps S between the strands of the insulated electrical wires 4 can be achieved. Therefore, the insulated electrical wire-covering method has good productivity.

[Other Embodiments]

It is to be understood that the embodiments disclosed herein are only illustrative and are not restrictive in all respects. The scope of the present invention is not limited to the configurations of the embodiments and is defined by the claims described below. The scope of the present invention is intended to cover all the modifications within the meaning and the scope of equivalents of the claims.

Figure 5:
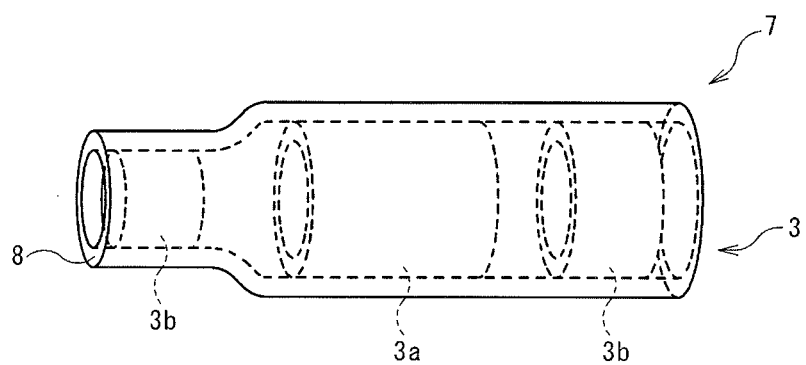
FIG. 5 is a perspective view of a heat-recoverable component according to an embodiment of the present invention, the embodiment being different from the embodiment illustrated in FIG. 1.

In the embodiments described above, a heat-recoverable component including a tube-shaped base material layer has been described. However, the heat-recoverable component according to the present invention is not limited to such a heat-recoverable component including a tube-shaped base material layer. Alternatively, the heat-recoverable component may be, for example, a heat-recoverable component 7 including a cap-shaped base material layer 8, as illustrated in FIG. 5. In the heat-recoverable component 7, one end of the base material layer 8 is clogged with a high-viscosity adhesive portion 3b, and the base material layer 8 has an opening only at the other end thereof. The heat-recoverable component 7 has a ring-shaped low-viscosity adhesive portion 3a on the inner circumferential surface of the base material layer 8 and further has a ring-shaped high-viscosity adhesive portion 3b between the low-viscosity adhesive portion 3a and the opening of the base material layer 8.

The heat-recoverable component 7 can be formed by thermally shrinking a portion of an end of a heat-recoverable component including a tube-shaped base material layer, the portion having a high-viscosity adhesive portion 3b, to clog one opening of the base material layer with a high-viscosity adhesive. This heat-recoverable component 7 can be suitably used for, for example, wire terminal treatment.

The heat-recoverable component may include another layer other than the base material layer and the adhesive layer. An example of the other layer is a heat-dissipating layer disposed on the outer circumference of the base material layer.

In the above embodiments, cases where a plurality of insulated electrical wires are covered have been described as the insulated electrical wire-covering method and the electrical wire bundle. Alternatively, a single insulated electrical wire may be covered.

EXAMPLES

Hereinafter, the present invention will be described more specifically by way of Examples. However, the present invention is not limited to the Examples described below.
[Adhesive Layer Tube]

As adhesive layer tubes, five types of tubes each containing a polyamide as a main component and one type of tube containing a polyethylene as a main component were prepared as shown in Table 1. The softening points of the prepared polyamides and the melting point of the prepared polyethylene are shown in Table 1. The softening points of the polyamides were measured by thermomechanical analysis (TMA). Specifically, each of the softening points was a measured value determined by an indentation measurement at a load of 0.3 g with a jig having a diameter ϕ of 3 mm using a TMA analyzer ("TMA-50" available from Shimadzu Corporation) while the temperature was increased from 25° C. to 150° C. at 10° C/min in a nitrogen atmosphere.

For each of the adhesive layer tubes, a shear viscosity was measured. The shear viscosity was measured by using a rotary rheometer ("MCR302" available from Anton Paar) with a PP-12 jig at the temperatures shown in Table 1 while changing a shear rate from 0.001 s$^{-1}$ to 1,000 s$^{-1}$. The results at a shear rate of 1 s$^{-1}$ are shown in Table 1.

TABLE 1

| | Shear viscosity | | Softening | Melting |
| --- | --- | --- | --- | --- |
| | 150° C. (Pa · s) | 125° C. (Pa · s) | point (° C.) | point (° C.) |
| Polyamide 1 | 0.5 | 245 | 98 | — |
| Polyamide 2 | 9.5 | 335 | 109 | — |
| Polyamide 3 | 32 | 220 | 112 | — |
| Polyamide 4 | 125 | 1020 | 128 | — |
| Polyamide 5 | 8230 | 38860 | 137 | — |
| Polyethylene 1 | 3530 | 7120 | — | 107 |

[Production of Heat-Recoverable Component]

First, a heat-shrinkable tube (material: polyethylene, inner diameter before shrinkage: 10 mm, wall thickness: 0.65 mm, inner diameter after shrinkage: 4 mm, wall thickness: 1.5 mm, length: 70 mm, heat shrinkage temperature: 150° C.) was prepared as a cylindrical base material layer.

Next, a first adhesive layer tube (inner diameter: 8 mm, wall thickness: 0.4 mm, length: 20 mm) was inserted into the heat-shrinkable tube so as to be located at substantially the center of the heat-shrinkable tube. A portion of the heat-shrinkable tube, the portion corresponding to the position of the first adhesive layer tube, was thermally shrunk from the outer surface of the heat-shrinkable tube to fix the first adhesive layer tube. Thus, a low-viscosity adhesive portion was formed. Subsequently, a second adhesive layer tube (inner diameter: 8 mm, wall thickness: 0.4 mm, length: 10 mm) was inserted into the heat-shrinkable tube so as to be located between the low-viscosity adhesive portion and an opening of the heat-shrinkable tube. A portion of the heat-shrinkable tube, the portion corresponding to the position of the second adhesive layer tube, was thermally shrunk from the outer surface of the heat-shrinkable tube to fix the second adhesive layer tube. Thus, a high-viscosity adhesive portion was formed. Note that since the heat-shrinkable tube has openings at both ends thereof, the high-viscosity adhesive portion was formed on each end of the heat-shrinkable tube. Heat-recoverable component Nos. 1 to 6 were obtained by varying the first adhesive layer tube forming the low-viscosity adhesive portion and the second adhesive layer tube forming the high-viscosity adhesive portion, as shown in Table 2.

Conductor-exposed portions of insulated electrical wires were covered with the heat-recoverable component Nos. 1 to 6.

The insulated electrical wires were prepared by joining seven electrical wires by ultrasonic welding, each of the electrical wires being "AVSS 0.5" available from Sumitomo Wiring Systems, Ltd. (conductor: annealed copper stranded conductor, number of strands: 8, strand diameter: 0.32 mm, conductor cross-sectional area: 0.56 mm$^2$, insulating coating: polyvinyl chloride). The heat-recoverable components were heated at 150° C., which was the heat shrinkage temperature, for 5 minutes to be thermally shrunk, thus obtaining electrical wire bundles.

[Evaluation Method]

For the electrical wire bundles, water blocking between strands and an outflow of adhesives were evaluated.

<Water Blocking Between Strands>

Regarding the evaluation of water blocking between strands, an air leakage test was performed by injecting compressed air at 0.2 MPa from an end of each of the seven insulated electrical wires constituting the electrical wire bundle. The evaluation criteria are as follows. Table 2 shows the results.

(Evaluation Criteria of Water Blocking Between Strands)

A: Air leakage is not observed, and water blocking between strands is achieved.

B: Air leakage is observed, and water blocking between strands is insufficient.

<Outflow of Adhesive>

The outflow of an adhesive to the outside of the heat-recoverable component was evaluated by observing the appearance of the heat-recoverable component after heat shrinkage. This evaluation was performed for each of the low-viscosity adhesive and the high-viscosity adhesive in accordance with the evaluation criteria described below. Table 2 shows the results.

(Evaluation Criteria of Outflow of Adhesive)

A: An outflow of an adhesive is not observed.

B: An outflow of an adhesive is observed.

TABLE 2

| | Low-viscosity adhesive | | High-viscosity adhesive | | | Evaluation results | | |
|---|---|---|---|---|---|---|---|---|
| | | | | | | Water | Outflow | |
| | Material | Viscosity (150° C.) (Pa·s) | Material | Viscosity (150° C.) (Pa·s) | Viscosity ratio | blocking between strands | Low-viscosity adhesive | High-viscosity adhesive |
| No. 1 | Polyamide 1 | 0.5 | Polyethylene1 | 3530 | 7060 | A | A | A |
| No. 2 | Polyamide 1 | 0.5 | Polyamide 4 | 125 | 250 | A | A | A |
| No. 3 | Polyamide 2 | 9.5 | Polyamide 5 | 8230 | 866 | A | A | A |
| No. 4 | Polyamide 3 | 32 | Polyethylene1 | 3530 | 110 | B | A | A |
| No. 5 | Polyamide 1 | 0.5 | Polyamide 3 | 32 | 64 | A | A | B |
| No. 6 | Polyamide 1 | 0.5 | Polyamide 5 | 8230 | 16460 | A | B | A |

Referring to the results in Table 2, regarding the electrical wire bundles obtained by using the heat-recoverable component Nos. 1 to 3, during heat shrinkage, water blocking between strands can be achieved, and an outflow of an adhesive from an opening can be prevented. In contrast, regarding the electrical wire bundle obtained by using the heat-recoverable component No. 4, it is believed that since the shear viscosity of the low-viscosity adhesive portion exceeded 10, the low-viscosity adhesive could not sufficiently penetrate between the strands during heat shrinkage of the heat-recoverable component, and water blocking between the strands was insufficient. Regarding the electrical wire bundle obtained by using the heat-recoverable component No. 5, it is believed that since the shear viscosity of the high-viscosity adhesive portions was less than 100, the high-viscosity adhesive itself flowed out from an opening. Regarding the electrical wire bundle obtained by using the heat-recoverable component No. 6, it is believed that since the ratio of the shear viscosity of the high-viscosity adhesive portions to the shear viscosity of the low-viscosity adhesive portion exceeded 15,000, the low-viscosity adhesive flowed out from an opening of the base material layer before the high-viscosity adhesive clogs the opening of the base material layer.

The above results show that when the shear viscosity of the low-viscosity adhesive portion is 10 or less, the shear viscosity of the high-viscosity adhesive portions is 100 or more, and the ratio of the shear viscosity of the high-viscosity adhesive portions to the shear viscosity of the low-viscosity adhesive portion is 15,000 or less, during heat shrinkage, water blocking between strands can be achieved, and an outflow of an adhesive from an opening can be prevented.

| Reference Signs List | | | |
|---|---|---|---|
| 1, 7 | heat-recoverable component | 2, 8 | base material layer |
| 3 | adhesive layer | 3a | low-viscosity adhesive portion |
| 3b | high-viscosity adhesive portion | 4 | insulated electrical wire |
| 4a | conductor | 4b | insulating coating |
| 4c | joint | 5 | electrical wire bundle |
| 6 | covering material | X | strand |
| S | gap between strands | | |

The invention claimed is:

1. A heat-recoverable component comprising a tube-shaped base material layer having heat shrinkability; and an adhesive layer formed on an inner circumferential surface of the base material layer,
wherein the adhesive layer includes a low-viscosity adhesive portion formed on a region including a midpoint of the base material layer in a length direction,
the adhesive layer further includes two high-viscosity adhesive portions in which one is disposed between the low-viscosity adhesive portion and one opening of the base material layer and the other is disposed between the low-viscosity adhesive portion and the other opening of the base material layer,
the low-viscosity adhesive portion has a shear viscosity of 10 Pa·s or less at a shear rate of 1 s$^{-1}$ at a heat shrinkage temperature of the base material layer,
the high-viscosity adhesive portion has a shear viscosity of 100 Pa·s or more at a shear rate of 1 s$^{-1}$ at the heat shrinkage temperature of the base material layer, and
at the heat shrinkage temperature, a ratio of the shear viscosity of the high-viscosity adhesive portion to the shear viscosity of the low-viscosity adhesive portion is 15,000 or less.

2. The heat-recoverable component according to claim 1, wherein the low-viscosity adhesive portion contains a polyamide as a main component.

3. The heat-recoverable component according to claim 1, wherein the high-viscosity adhesive portion contains, as a main component, a polyethylene, an ethylene-vinyl acetate copolymer, an ethylene-ethyl acrylate copolymer, or a polyamide.

4. An electrical wire bundle comprising:
a plurality of insulated electrical wires bundled; and
a tube-shaped or cap-shaped covering material that covers conductor-exposed portions in the plurality of insulated electrical wires,
wherein the heat-recoverable component according to claim 1 is used as the covering material, and
the low-viscosity adhesive portion covers the conductor-exposed portions.

5. An insulated electrical wire-covering method for covering conductor-exposed portions of a plurality of insulated electrical wires, the method comprising:
a step of placing the heat-recoverable component according to claim 1 over the plurality of insulated electrical wires so as to cover the conductor-exposed portions; and
a step of heating the heat-recoverable component.

6. The heat-recoverable component according to claim 1, wherein the low-viscosity adhesive portion has a midpoint in the length direction,
the base material layer has a midpoint in the length direction, and
a difference between the midpoint of the low-viscosity adhesive portion and the midpoint of the base material layer is 5% or less of an average length of the low-viscosity adhesive portion.

7. The electrical wire bundle according to claim 4,
wherein the insulated electrical wires comprise a plurality of conductors and insulating coatings that cover the plurality of conductors, and
the low-viscosity adhesive fills gaps between the conductors and gaps between the conductors and the insulating coatings.

8. The electrical wire bundle according to claim 4,
wherein the covering material is cap-shaped, and
one end of the base material layer is clogged with the high-viscosity adhesive portion.

* * * * *